US012177823B2

(12) United States Patent
Dong

(10) Patent No.: US 12,177,823 B2
(45) Date of Patent: Dec. 24, 2024

(54) METHOD FOR INDICATING BUFFERED DOWNLINK DATA, DOWNLINK DATA ACQUISITION METHOD AND ACCESS POINT

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 374 days.

(21) Appl. No.: 17/635,372

(22) PCT Filed: Aug. 23, 2019

(86) PCT No.: PCT/CN2019/102304
§ 371 (c)(1),
(2) Date: Feb. 14, 2022

(87) PCT Pub. No.: WO2021/035411
PCT Pub. Date: Mar. 4, 2021

(65) Prior Publication Data
US 2022/0338195 A1 Oct. 20, 2022

(51) Int. Cl.
*H04W 72/0453* (2023.01)
(52) U.S. Cl.
CPC .............. *H04W 72/0453* (2013.01)
(58) Field of Classification Search
CPC . H04W 72/0453; H04W 88/08; H04W 92/10; H04W 76/10
See application file for complete search history.

(56) References Cited

U.S. PATENT DOCUMENTS

| 7,613,139 B1 * | 11/2009 | Wang | H04W 24/00 455/574 |
| 2007/0211745 A1 | 9/2007 | Deshpande et al. | |

(Continued)

FOREIGN PATENT DOCUMENTS

| CN | 101222388 A | 7/2008 |
| CN | 104244333 A | 12/2014 |

(Continued)

OTHER PUBLICATIONS

International Search Report of PCT Application No. PCT/CN2019/102304 dated May 26, 2020 with English translation, (8p).

(Continued)

*Primary Examiner* — Un C Cho
*Assistant Examiner* — Lalita W Pace
(74) *Attorney, Agent, or Firm* — Arch & Lake LLP

(57) ABSTRACT

A method for indicating buffered downlink data, a method for obtaining downlink data and an access point are provided. The method for indicating buffered downlink data includes: generating a beacon frame, where the beacon frame includes an information bit for indicating buffered downlink data, and the information bit for indicating buffered downlink data is configured to indicate whether downlink data is buffered in the beacon frame; and transmitting, in a listening frequency band of each station, the beacon frame to the corresponding station, where the listening frequency band is a frequency band at which the corresponding station listens to obtain the downlink data.

14 Claims, 5 Drawing Sheets

(56) References Cited

U.S. PATENT DOCUMENTS

| | | |
|---|---|---|
| 2007/0253399 A1 | 11/2007 | Deshpande et al. |
| 2007/0297438 A1 | 12/2007 | Meylan et al. |
| 2009/0252165 A1 | 10/2009 | Zhang et al. |
| 2010/0177756 A1 | 7/2010 | Choi et al. |
| 2012/0099507 A1 | 4/2012 | Zhang et al. |
| 2012/0176949 A1 | 7/2012 | Meylan et al. |
| 2014/0064173 A1 | 3/2014 | Meylan et al. |
| 2015/0103727 A1 | 4/2015 | Zhang et al. |
| 2016/0044676 A1* | 2/2016 | Choi .............. H04W 72/23 370/329 |
| 2016/0050683 A1 | 2/2016 | Gupta et al. |
| 2016/0100443 A1 | 4/2016 | Li et al. |
| 2016/0165524 A1* | 6/2016 | Kim .............. H04W 48/16 370/338 |
| 2016/0353417 A1* | 12/2016 | Kim .............. H04W 72/23 |
| 2017/0064625 A1* | 3/2017 | Sampath ........ H04W 52/0216 |
| 2019/0373549 A1 | 12/2019 | Amin et al. |
| 2021/0360522 A1* | 11/2021 | Chitrakar .......... H04L 1/1896 |

FOREIGN PATENT DOCUMENTS

| | | |
|---|---|---|
| CN | 105210448 A | 12/2015 |
| CN | 105578577 A | 5/2016 |
| CN | 107645372 A | 1/2018 |
| CN | 109151951 A | 1/2019 |
| CN | 109152062 A | 1/2019 |
| WO | 2008086753 A1 | 7/2008 |
| WO | 2018145768 A1 | 8/2018 |

OTHER PUBLICATIONS

Extended European Search Report issued in Application No. 19942769.1, dated Mar. 22, 2022,(14p).

Hua Qin et al., "ZigBee-Assisted Power Saving Managementfor Mobile Devices", IEEE transactions on Mobile Computer, vol. 13, No. 12, Dec. 2014, (15p).

CNOA of Application No. 201980001774.7 dated on Nov. 2, 2022 with English translation,(21p).

Yi Xie et al., "An Adaptive PSM Mechanism in WLAN Based onTraffic Awareness", 978-1-4673-5200-1/13, @2013 IEEE, pp. 568-573, (6p).

INOA issued in Application No. 202247014797 dated on Aug. 2, 2022,(7p).

* cited by examiner

METHOD FOR INDICATING BUFFERED DOWNLINK DATA, DOWNLINK DATA ACQUISITION METHOD AND ACCESS POINT

CROSS-REFERENCE TO RELATED APPLICATION

This application is the national phase application of International Application No. PCT/CN2019/102304, filed on Aug. 23, 2019, the entire content of which is incorporated herein by reference for all purposes.

TECHNICAL FIELD

The disclosure relates to the field of communication technology, in particular to a method and an apparatus for indicating buffered downlink data, a method and an apparatus for obtaining downlink data, an access point, a station and a computer-readable storage medium.

BACKGROUND

The aggregation and coordination of multiple frequency bands refers to simultaneous communication between devices in frequency bands of 2.4 GHz, 5.8 GHz and 6-7 GHz. For the simultaneous communication between devices in the frequency bands, a new media access control (MAC) mechanism needs to be defined for management.

The way of obtaining buffered downlink data by a terminal in a power-saving state may be that, periodically awaking and listening to a beacon frame broadcast by an access point (AP), and parsing corresponding traffic indication map (TIM) information to determine whether there is buffered downlink data.

In the related art, the AP may send the beacon frame in multiple frequency bands at the same time, while it is a technical problem that needs to be solved about how to send by the AP the beacon frame in multiple frequency bands frame, and how to detect by a station in a power-saving state the beacon frame to obtain downlink data.

SUMMARY

According to a first aspect of the present disclosure, there is provided a method for indicating buffered downlink data. The method is performed by an access point (AP) and includes: generating a beacon frame, where the beacon frame includes an information bit for indicating buffered downlink data, and the information bit for indicating buffered downlink data is configured to indicate whether downlink data is buffered in the beacon frame; and transmitting the beacon frame to a corresponding station in a listening frequency band of each station, where the listening frequency band is a frequency band where the corresponding station listens to obtain the downlink data.

According to a second aspect of the present disclosure, there is provided a method for obtaining downlink data. The method is performed by a station and includes: listening a beacon frame transmitted by an AP in a listening frequency band of the station; in response to listening the beacon frame, parsing an information bit for indicating buffered downlink data from the beacon frame, where the information bit is configured to indicate whether downlink data is buffered in the beacon frame; and in response to the information bit for indicating buffered downlink data indicating that downlink data is buffered in the beacon frame, obtaining downlink data by transmitting a power saving poll frame to the AP during a contention period of the listening frequency band.

According to a third aspect of the present disclosure, an AP is provided. The AP includes a processor and a memory for storing instructions executable by the processor. The processor is configured to: generate a beacon frame, where the beacon frame includes an information bit for indicating buffered downlink data, and the information bit for indicating buffered downlink data is configured to indicate whether downlink data is buffered in the beacon frame; and transmit the beacon frame to a corresponding station in a listening frequency band of each station, where the listening frequency band is a frequency band where the corresponding station listens to obtain the downlink data.

It should be understood that the above general description and the following detailed description are only exemplary and explanatory, and cannot limit the disclosure.

BRIEF DESCRIPTION OF THE DRAWINGS

The drawings here are incorporated into the specification and constitute a part of the specification, illustrate embodiments in accordance with the disclosure and together with the specification are used to explain the principle of the disclosure.

DETAILED DESCRIPTION

Embodiments may be described in detail in the disclosure, the examples of which are illustrated in the accompanying drawings. When the following description refers to the drawings, the same numbers in different drawings indicate the same or similar elements unless otherwise indicated. The implementations described in the following embodiments do not represent all implementations consistent with the disclosure. On the contrary, they are merely examples of apparatuses and methods consistent with some aspects of the disclosure as detailed in the appended claims.

Figure 1:
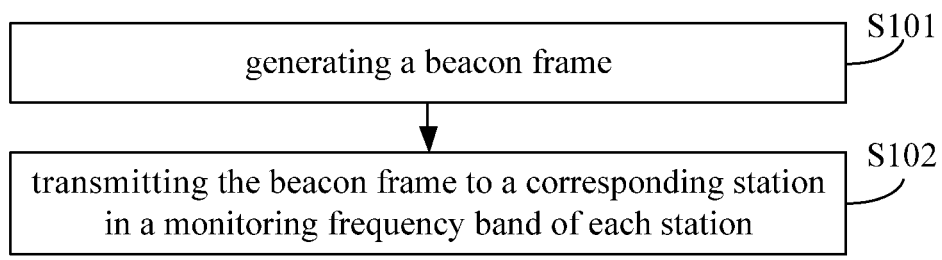
FIG. 1 is a flowchart illustrating a method for indicating buffered downlink data according to an embodiment of the disclosure.

FIG. 1 is a flowchart illustrating a method for indicating buffered downlink data according to an embodiment of the present disclosure. This embodiment is described from an access point (AP) side. As illustrated in FIG. 1, the method for indicating buffered downlink data includes the following steps S101-S102.

In S101, a beacon frame is generated, in which the beacon frame includes an information bit for indicating buffered downlink data, and the information bit for indicating buffered downlink data is configured to indicate whether downlink data is buffered in the beacon frame.

When the information bit for indicating buffered downlink data is a first preset value, such as "1", it indicates that the downlink data is buffered in the beacon frame. When the information bit for indicating buffered downlink data is a second preset value, such as "0", it indicates that no downlink data is buffered in the beacon frame.

In the embodiment, the information bit for indicating buffered downlink data in the beacon frame where a wake-up cycle is located can be set as having buffered downlink data based on a priority of downlink data to be buffered.

For example, for low-priority downlink data, the information bit for indicating buffered downlink data in the beacon frame where the wake-up cycle is located can be set as having buffered downlink data. That is, the information bit for indicating buffered downlink data and the wake-up cycle can be set in the same beacon frame. Simultaneously, the station obtains time synchronization function (TSF) information in the beacon frame to keep time synchronization with the AP. As such, the TSF and the information bit for indicating buffered downlink data in the beacon frame are thus multiplexed, which is conducive to saving powers at the station.

In S102, a beacon frame is transmitted to a corresponding station in a listening frequency band of each station, in which the listening frequency band is a frequency band where the corresponding station listens obtain the downlink data.

Alternatively, before the step in S102, the method may further include: determining the listening frequency band of each station.

Determining the listening frequency band of each station may include: establishing an association with each station, and determining a frequency band where the association is established as the listening frequency band of each station.

Since the AP determines a listening frequency band of each station based on load conditions in different frequency bands and conflicts during a contention period, the determined listening frequency band may be different from the frequency band where the association is established. In this case, a listening frequency band determined for each station may be carried in a negotiation frame, in which the listening frequency band is used to listen a beacon frame broadcast by the AP with an information bit for indicating buffered downlink data. The negotiation frame is also configured to negotiate a sleep cycle of each station between the AP and each station.

In the embodiment, after the listening frequency band of each station is determined, a beacon frame is transmitted to the corresponding station in the listening frequency band of each station, so that each station listens the beacon frame in the corresponding listening frequency band and parses the listened beacon frame to obtain the downlink data.

In the embodiment, the beacon frame including the information bit for indicating buffered downlink data is transmitted to the corresponding station in the listening frequency band of each station, which accordingly solves the problem about how the AP transmits the beacon frame in the multiple frequency bands.

Figure 2:
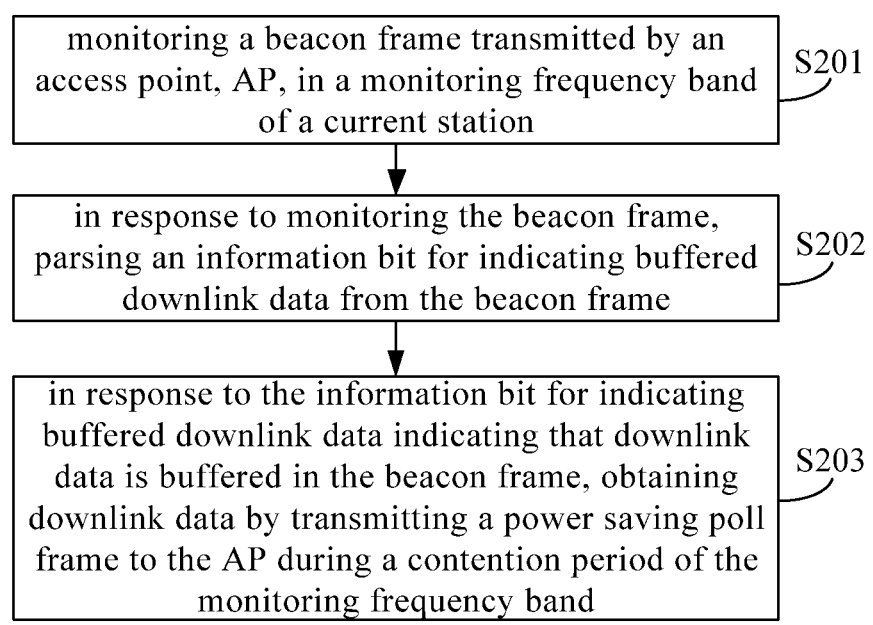
FIG. 2 is a flowchart illustrating a method for obtaining downlink data according to an embodiment of the disclosure.

FIG. 2 is a flowchart illustrating a method for obtaining downlink data according to an embodiment of the present disclosure. The embodiment is described from a station side. As illustrated in FIG. 2, the method includes the following steps S201-S203.

In S201, a beacon frame transmitted by the AP is listened in a listening frequency band of a current station.

Alternatively, before the step in S201, the method may further include: establishing an association with the AP, and determining a frequency band where the association is established as the listening frequency band of the current station.

Since the AP determines a listening frequency band of each station based on load conditions in different frequency bands and conflicts during a contention period, the determined listening frequency band may be different from the frequency band where the association is established. In this case, a listening frequency band determined for each station may be carried in a negotiation frame. The negotiation frame is configured to negotiate a sleep cycle of the current station between the current station and the AP.

After determining the listening frequency band of the current station, the beacon frame transmitted by the AP is listened in the listening frequency band.

In S202, in response to listening the beacon frame, an information bit for indicating buffered downlink data is parsed from the beacon frame.

In S203, in response to the information bit for indicating buffered downlink data indicating that downlink data is buffered in the beacon frame, downlink data is obtained by transmitting a power saving (PS) poll frame to the AP during a contention period (CP) of the listening frequency band.

In the above embodiment, the beacon frame transmitted by the AP is listened in the listening frequency band of the current station, and the information bit for indicating buffered downlink data is parsed from the listened beacon frame. If the information bit for indicating buffered downlink data indicates that the beacon frame has the buffered downlink data, the downlink data is obtained by transmitting the power-saving poll frame to the AP during the contention period of the listening frequency band.

Figure 3:
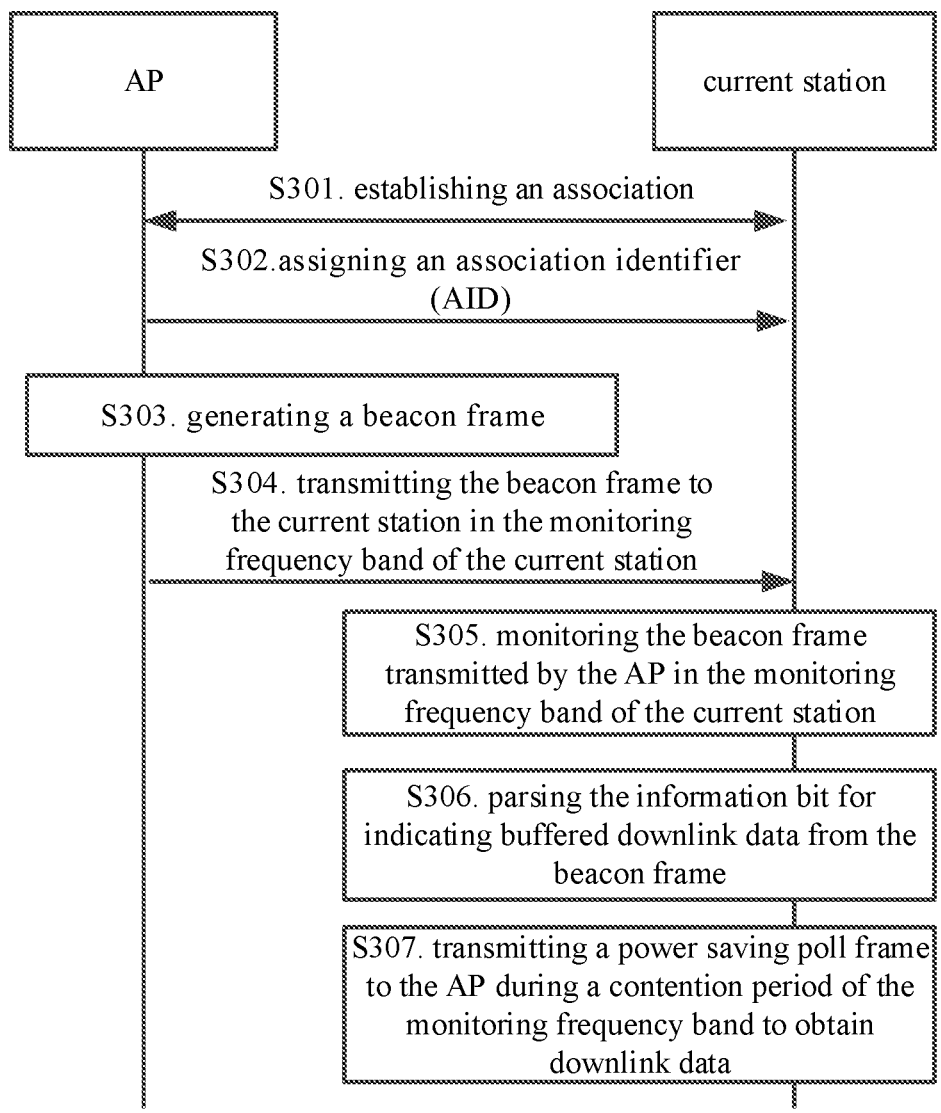
FIG. 3 is a signaling flow chart illustrating a method for obtaining downlink data according to an embodiment of the disclosure.

FIG. 3 is a signaling flow chart illustrating a method for obtaining downlink data according to an embodiment of the present disclosure. The embodiment is described from the perspective of interaction between an access point (AP) and a current station. As illustrated in FIG. 3, the method includes the following steps S301-S307.

In S301, the current station establishes an association with the AP.

Each station can be associated with the AP in multiple ways, such as the following two ways.

In the first way (11), the AP broadcasts a beacon frame in a set frequency band; at least one station receives the broadcast beacon frame and transmits an association request frame to the AP; and the AP returns an association response frame to the corresponding station based on the association request frame, so as to establish association with each station. The set frequency band may be one of multiple working frequency bands.

In the second way (12), at least one station transmits a probe request frame to the AP; the AP receives the probe request frame and returns the probe response frame to the corresponding station; the corresponding station receives the probe response frame and transmits an association request frame to the AP; the AP returns an association response frame to the corresponding station based on the association request frame, so as to establish association with each station.

In S302, the AP assigns an association identifier (AID) to the current station, and determines a frequency band where the association is established as the listening frequency band of the current station.

Since the AP may transmit the beacon frame in multiple frequency bands, the AP can only manage a maximum of 2007 stations in a basis service set (BSS), for an AP that can communicate in multiple frequency bands at the same time, an AID can be assigned to each station in the following ways.

In the first way (21), a unique association identifier is assigned to each station based on a sequence of establishing the association for all working frequency bands.

For example, when all working frequency bands are f1, f2 and f3, station 1 first associates with the AP under the f1, station 2 associates with the AP under the f1 and station 3 associates with the AP under the f2, then the AP first assigns AID1 to the station 1, assigns AID2 to the station 2, and assigns AID3 to the station 3. By this allocation, each station operating in multiple frequency bands can only get one AID.

In the second way (22) a unique association identifier is assigned to each station that establishes the association under each working frequency band.

In the embodiment, the AP may be divided into virtual Aps whose number is equal to the number of all working frequency bands. That is, one working frequency band corresponds to one virtual AP. Then, the virtual AP assigns a unique AID to the stations associated through the corresponding frequency band.

For example, when all the working frequency bands are f1, f2 and f3 and the AP are divided into three virtual Aps (i.e., AP11, AP12 and AP13), then the AP13 assigns an AID to a station that establishes the association under the f1, the AP12 assigns an AID to a station that that establishes the association under the f2, and the AP13 assigns an AID to a station that that establishes the association under the f3.

By this allocation method, each station working in multiple frequency bands can obtain multiple AIDs, each of which corresponds to each frequency band. For example, when the station 1 can work in three frequency bands, the station 1 has three AIDs corresponding to the three frequency bands respectively.

In S303, the AP generates a beacon frame, in which the beacon frame includes an information bit for indicating buffered downlink data, and the information bit for indicating buffered downlink data is configured to indicate whether downlink data is buffered in the beacon frame.

In S304, the AP transmits the beacon frame to the current station in the listening frequency band of the current station.

In S305, the current station listens the beacon frame transmitted by the AP in the listening frequency band of the current station.

In S306, in response to listening the beacon frame, the information bit for indicating buffered downlink data is parsed from the beacon frame.

In S307, in response to the information bit for indicating buffered downlink data indicating that downlink data is buffered in the beacon frame, the current station transmits a power saving poll frame to the AP during a contention period of the listening frequency band to obtain downlink data.

It should be noted that the embodiment takes one station as an example to describe the process of obtaining downlink data. For the case of multiple stations, the implementation is similar to that of one station, which is not described in detail here.

In the above embodiment, the interaction between the AP and the current station enables that, the AP determines the frequency band where the association is established as the listening frequency band of the current station, and transmits the beacon frame to the current station in the listening frequency band of the current station, then the current station listens the beacon frame transmitted by the AP in the listening frequency band of the current station to obtain the downlink data. In this way, a problem is solved that the AP transmits the beacon frame and the current station listens the beacon frame in the multi frequency bands to obtain the downlink data, the current station can communicate with the AP in the multiple frequency bands, which improves the throughput and data rate of the system and indirectly improves the effective utilization of spectrum.

Figure 4:
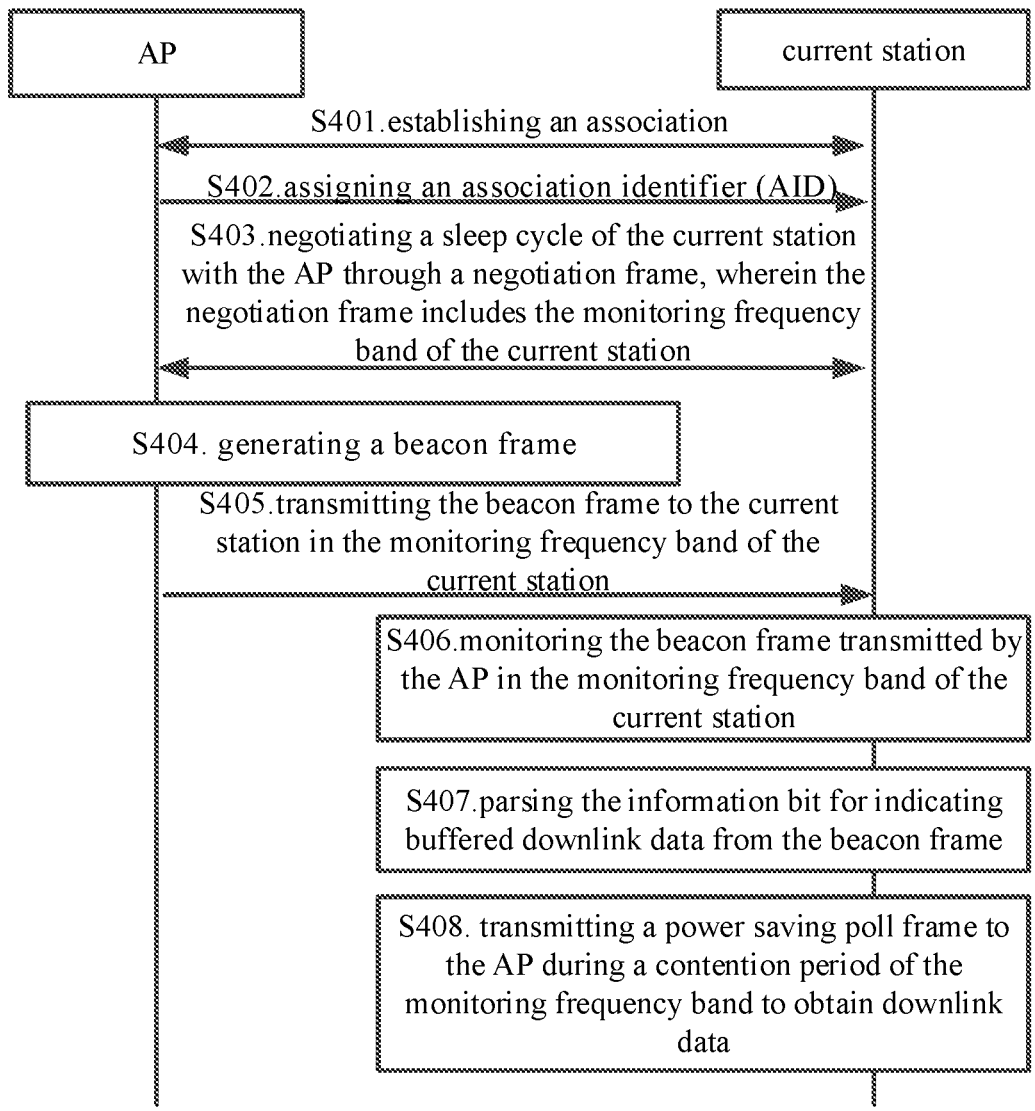
FIG. 4 is a signaling flow chart illustrating another method for obtaining downlink data according to an embodiment of the disclosure.

FIG. 4 is a signaling flowchart illustrating another method for obtaining downlink data according to an embodiment of the present disclosure. This embodiment is described from the perspective of interaction between an access point (AP) and a current station. As illustrated in FIG. 4, the method includes the following steps S401-S408.

In S401, the current station establishes an association with the AP.

In S402, the AP assigns an association identifier (AID) to the current station.

The AP may assign an AID to the current station by the first way (21) or the second way (22) in S302.

In S403, the current station negotiates a sleep cycle of the current station with the AP through a negotiation frame. The negotiation frame includes the listening frequency band of the current station. The frequency band where the association is established is different from the listening frequency band.

After the current station establishes the association with the AP, negotiates its sleep cycle with the AP if it wants to be in a sleep state. The negotiation frame includes the listening frequency band of the current station, and the frequency band where the association is established is different from the listening frequency band.

In S404, the AP generates a beacon frame, in which the beacon frame includes an information bit for indicating buffered downlink data, and the information bit for indicating buffered downlink data is configured to indicate whether downlink data is buffered in the beacon frame.

In order to keep time synchronization with the AP, the STA (i.e., station) in the sleep state needs to awake periodically to listen the time synchronization function information in the beacon frame to maintain time synchronization with the AP. For downlink data with a low priority, the AP can place both the information bit for indicating buffered downlink data and a wake-up cycle into the same beacon frame, so as to save the station's powers.

In S405, the AP sends a beacon frame to the current station in the listening frequency band of the current station.

In S406, the current station listens the beacon frame transmitted by the AP in the listening frequency band of the current station.

In S407, in response to listening the beacon frame, the information bit for indicating buffered downlink data is parsed from the beacon frame.

In S408, in response to the information bit for indicating buffered downlink data indicating that downlink data is buffered in the beacon frame, downlink data is obtained by transmitting the a power saving poll frame to the AP during a contention period of the listening frequency band.

It should be noted that in this embodiment, a station is taken as an example to describe the process of obtaining downlink data. For the case of multiple stations, the implementation is similar to that of one station, which is not described in detail here.

In the above embodiment, by the interaction between the AP and the current station, by the listening frequency band of the current station carried in the negotiation frame and the beacon frame transmitted to the current station in the listening frequency band of the current station, the current station is caused to listen the beacon frame transmitted by the AP under the listening frequency band of the current station to obtain the downlink data, so as to solve the problem that the AP transmits the beacon frame and the current station listens the beacon frame in the multiple frequency bands to obtain the downlink data, so that the AP and the current station can communicate in the multiple frequency bands, which improves the throughput and data rate of the system and indirectly improves the effective utilization of the spectrum.

Figure 5:
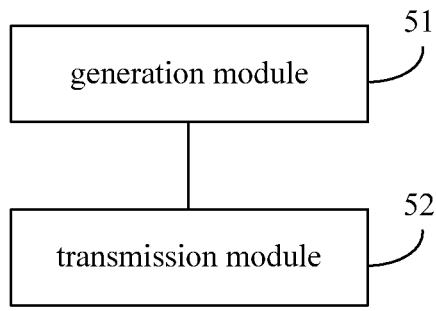
FIG. 5 is a block diagram illustrating an apparatus for indicating buffered downlink data according to an embodiment.

FIG. 5 is a block diagram illustrating an apparatus for indicating buffered downlink data according to an embodiment. The apparatus for indicating buffered downlink data is located in an access point (AP). As illustrated in FIG. 5, the apparatus for indicating buffered downlink data includes: a generation module 51 and a transmission module 52.

The generating module 51 is configured to generate a beacon frame, in which the beacon frame includes an information bit for indicating buffered downlink data, and the information bit for indicating buffered downlink data is configured to indicate whether downlink data is buffered in the beacon frame.

When the information bit for indicating buffered downlink data is a first preset value, such as "1", it indicates that the downlink data is buffered in the beacon frame. When the information bit for indicating buffered downlink data is a second preset value, such as "0", it indicates that no downlink data is buffered in the beacon frame.

In the embodiment, the information bit for indicating buffered downlink data in the beacon frame where a wake-up cycle is located can be set as having buffered downlink data based on a priority of downlink data to be buffered.

For example, for low-priority downlink data, the information bit for indicating buffered downlink data in the beacon frame where the wake-up period is located can be set as having buffered downlink data. That is, the information bit for indicating buffered downlink data and the wake-up cycle can be set in the same beacon frame. Simultaneously, the station obtains time synchronization function (TSF) information in the beacon frame to keep time synchronization with the AP. As such, the TSF and the information bit for indicating buffered downlink data in the beacon frame are thus multiplexed, which is conducive to saving powers at the station.

The transmission module 52 is configured to transmit the beacon frame generated by the generation module 51 to a corresponding station in a listening frequency band of each station, in which the listening frequency band is a frequency band where the corresponding station listens to obtain the downlink data.

Alternatively, before the transmission module 52 transmits the beacon frame generated by the generating module 51 to the corresponding station in the listening frequency band of each station, the transmission module 52 may also determine the listening frequency band of each station.

Determining the listening frequency band of each station may include: establishing an association with each station, and determining a frequency band where the association is established as the listening frequency band of each station.

Since the AP determines a listening frequency band of each station based on load conditions in different frequency bands and conflicts during a contention period, the determined listening frequency band may be different from the frequency band where the association is established. In this case, a listening frequency band determined for each station may be carried in a negotiation frame, in which the listening frequency band is used to listen a beacon frame broadcast by the AP with an information bit for indicating buffered downlink data. The negotiation frame is also configured to negotiate a sleep cycle of each station between the AP and each station.

In the embodiment, after the listening frequency band of each station is determined, a beacon frame is transmitted to the corresponding station in the listening frequency band of each station, so that each station listens the beacon frame in the corresponding listening frequency band and parses the listened beacon frame to obtain the downlink data.

In the embodiment, the beacon frame including the information bit for indicating buffered downlink data is transmitted to the corresponding station in the listening frequency band of each station, which accordingly solves the problem about how the AP transmits the beacon frame in the multiple frequency bands.

Figure 6:
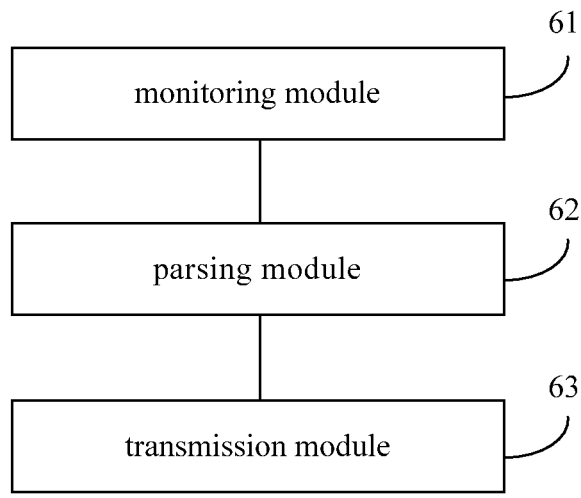
FIG. 6 is a block diagram illustrating an apparatus for obtaining downlink data according to an embodiment.

FIG. 6 is a block diagram illustrating an apparatus for obtaining downlink data according to an embodiment. The apparatus for obtaining downlink data is located in a station. As illustrated in FIG. 6, the apparatus for obtaining downlink data includes a listening module 61, a parsing module 62 and a transmission module 63.

The listening module 61 is configured to listen a beacon frame transmitted by an access point (AP) in the listening frequency band of the current station.

Alternatively, before the listening module 61 listens the beacon frame transmitted by the AP, the listening module 61 also establishes an association with the AP, and determines a frequency band where the association is established as the listening frequency band of the current station.

Since the AP determines a listening frequency band of each station based on load conditions in different frequency bands and conflicts during a contention period, the determined listening frequency band may be different from the frequency band where the association is established. In this case, a listening frequency band determined for each station may be carried in a negotiation frame. The negotiation frame is configured to negotiate a sleep cycle of the current station between the current station and the AP.

After the listening frequency band of the current station is determined, the beacon frame transmitted by the AP is listened in the listening frequency band.

The parsing module 62 is configured to parse an information bit for indicating buffered downlink data from the beacon frame in response to the listening module 61 listening the beacon frame.

The transmission module 63 is configured to obtain downlink data by transmitting a power saving poll frame to the AP during a contention period of the listening frequency band in response to the information bit for indicating buffered downlink data parsed by the parsing module 62 indicating that downlink data is buffered in the beacon frame.

In the embodiment, the beacon frame transmitted by the AP is listened in the listening frequency band of the current station, and the information bit for indicating buffered downlink data is parsed from the listened beacon frame. If the information bit for indicating buffered downlink data indicates that the beacon frame has the buffered downlink data, a power-saving poll frame is transmitted to the AP to obtain downlink data during a contention period of the listening frequency band, which accordingly solves a problem how the station listens the beacon frame to obtain the downlink data in the multiple frequency bands.

Figure 7:
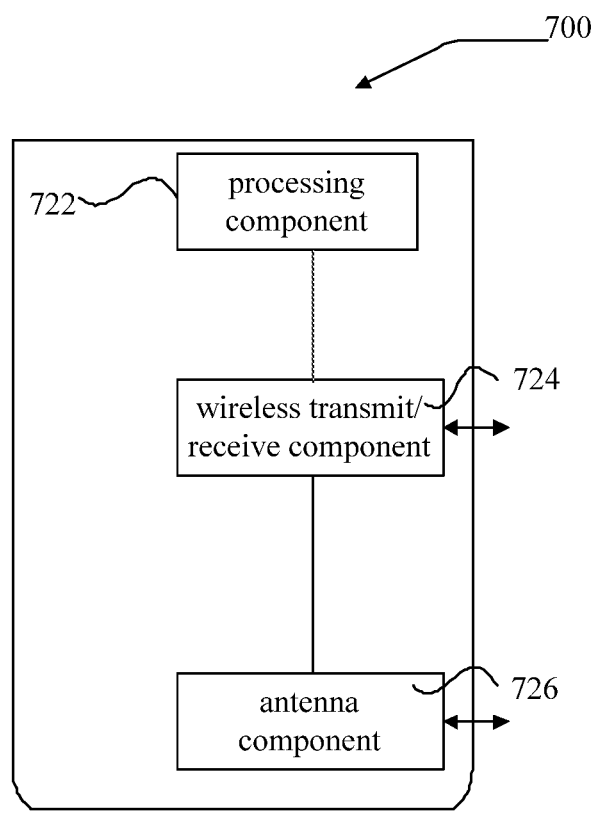
FIG. 7 is a block diagram illustrating a device suitable for indicating buffered downlink data according to an embodiment.

FIG. 7 is a block diagram illustrating a device suitable for indicating buffered downlink data according to an embodiment. The device 700 may be provided as an access point (AP). Referring to FIG. 7, the device 700 includes a processing component 722, a wireless transmit/receive component 724, an antenna component 726, and a signal processing portion specific to a wireless interface. The processing component 722 may further include one or more processors.

One of the processors in the processing component 722 can be configured to: generate a beacon frame, in which the beacon frame includes an information bit for indicating buffered downlink data, and the information bit for indicating buffered downlink data is configured to indicate whether downlink data is buffered in the beacon frame; and transmit the beacon frame to a corresponding station in a listening frequency band of each station, in which the listening frequency band is a frequency band where the corresponding station listens to obtain the downlink data.

In an embodiment, a non-transitory computer-readable storage medium including instructions is also provided, and the instructions can be executed by the processing component 722 of the device 700 to complete the above-mentioned method for indicating buffered downlink data. For example, the non-transitory computer-readable storage medium may be a ROM, a random access memory (RAM), a CD-ROM, a magnetic tape, a floppy disk, an optical data storage device, and the like.

Figure 8:
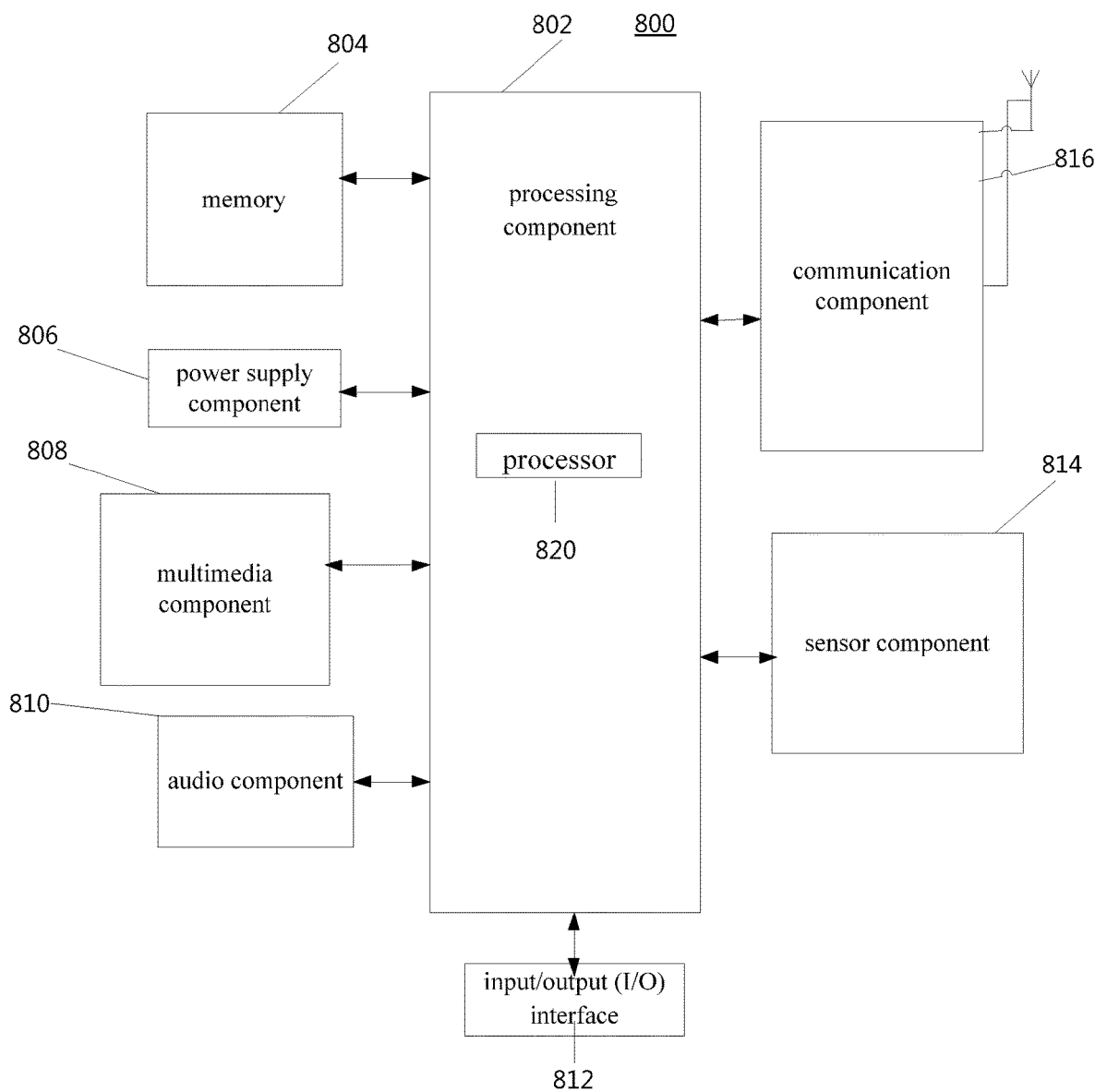
FIG. 8 is a block diagram illustrating a device for obtaining downlink data according to an embodiment.

FIG. 8 is a block diagram illustrating a device for obtaining downlink data according to an embodiment.

For example, the device 800 may be a station such as a mobile phone, a computer, a digital broadcast terminal, a messaging device, a game console, a tablet device, a medical device, a fitness device, a personal digital assistant, etc.

Referring to FIG. 8, the device 800 may include one or more of the following components: a processing component 802, a memory 804, a power supply component 806, a multimedia component 808, an audio component 810, an input/output (I/O) interface 88, a sensor component 814, and a communication component 816.

The processing component 802 generally controls overall operation of the device 800, such as the operations associated with display, phone calls, data communications, camera operations, and recording operations. The processing element 802 may include one or more processors 820 to execute instructions to perform all or part of the steps of the methods described above. Additionally, processing component 802 may include one or more modules that facilitate the interaction between processing component 802 and other components. For example, processing component 802 may include a multimedia module to facilitate interaction between the multimedia component 808 and the processing component 802.

One of the processors 820 in the processing component 802 can be configured to: listen a beacon frame transmitted by an access point, AP, in a listening frequency band of a current station; in response to listening the beacon frame, parse an information bit for indicating buffered downlink data from the beacon frame; and in response to the information bit for indicating buffered downlink data indicating that downlink data is buffered in the beacon frame, obtain downlink data by transmitting a power saving poll frame to the AP during a contention period of the listening frequency band.

The memory 804 is configured to store various types of data to support operation at device 800. Examples of such data include instructions for any application or method operating on device 800, contact data, phonebook data, messages, pictures, videos, etc. The memory 804 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply assembly 806 provides power to various components of the device 800. The power components 806 may include a power management system, one or more power sources, and other components associated with generating, managing, and distributing powers in the device 800.

The multimedia component 808 includes a screen that provides an output interface between device 800 and the user. In some embodiments, the screen may include a liquid crystal display (LCD) and a touch panel (TP). If the screen includes the touch panel, the screen may be implemented as a touch screen to receive input signals from a user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the device 800 is in an operation mode, such as a shooting mode or a video mode, the front camera and/or the rear camera may receive external multimedia data. Each of the front and rear cameras may be a fixed optical lens system or have a focal length and optical zoom capability.

The audio component 810 is configured to output and/or input audio signals. For example, the audio component 810 includes a microphone (MIC) that is configured to receive external audio signals when device 800 is in an operating mode, such as a call mode, a recording mode, and a voice recognition mode. The received audio signal may be further stored in the memory 804 or transmitted via the communication component 816. In some embodiments, the audio component 810 also includes a speaker for outputting audio signals.

The I/O interface 88 provides an interface between the processing component 802 and a peripheral interface module, which may be a keyboard, a click wheel, a button, or the like. These buttons may include, but are not limited to: a home button, a volume button, a starting button, and a locking button.

The sensor assembly 814 includes one or more sensors for providing status assessments of various aspects of device 800. For example, the sensor assembly 814 may detect an open/closed state of the device 800, relative positioning of the components, e.g., the display and the keypad, of the device 800, a change in position of the device 800 or a component of the device 800, a presence or absence of user contact with the device 800, an orientation or an acceleration/deceleration of the device 800 and a change in temperature of the device 800. The sensor assembly 814 may include a proximity sensor configured to detect a presence of nearby objects in the absence of any physical contact. The sensor assembly 814 may also include a light sensor, such as a CMOS or CCD image sensor, for use in imaging applications. In some embodiments, the sensor assembly 814 may also include an acceleration sensor, a gyroscope sensor, a magnetic sensor, a pressure sensor, or a temperature sensor.

The communication component 816 is configured to facilitate wired or wireless communication between the device 800 and other devices. The device 800 may access a wireless network based on a communication standard, such as WiFi, 2G, or 3G, or a combination thereof. In an embodiment, the communication component 816 receives broadcast signals or broadcast related information from an external broadcast management system via a broadcast channel. In an embodiment, the communication component 816 also includes a near field communication (NFC) module to facilitate short-range communication. For example, the NFC module may be implemented based on a radio frequency identity (RFID) technology, an infrared data association (IrDA) technology, an ultra-wideband (UWB) technology, a Bluetooth (BT) technology, and other technologies.

In an embodiment, the device 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In an embodiment, there is also provided a non-transitory computer-readable storage medium including instructions, such as included in the memory 804, executable by the processor 820 of the device 800 to perform the method described above. For example, the non-transitory computer-readable storage medium may be a ROM, a RAM, a CD-ROM, a magnetic tape, a floppy disc, an optical data storage device, and the like.

The technical solutions according to the embodiments of the present disclosure may include the following beneficial effects: by transmitting a beacon frame including an information bit for indicating buffered downlink data to the corresponding station in the listening frequency band of each station, the problem of how the AP transmits the beacon frame in the multiple frequency bands is solved. By listening the beacon frame transmitted by the AP in the listening frequency band of the current station, and parsing the information bit for indicating buffered downlink data from the listened beacon frame, in response to the information bit for indicating buffered downlink data indicating the beacon frame has the buffered downlink data, a power-saving poll frame is transmitted to the AP during a contention period of the listening frequency band to obtain the downlink data, which solves the problem of how the station listens the beacon frame to obtain the downlink data in the multiple frequency bands.

For the apparatus embodiments, since they basically correspond to the method embodiments, reference may be made to the partial descriptions in the method embodiments for related parts. The apparatus embodiments described above are only exemplary, in which the units described as separate components may or may not be physically separated, and the components displayed as units may or may not be physical units, that is, they may be located in a place, or can be distributed over multiple network elements. Some or all of the modules may be selected according to actual needs to achieve the purpose of the solution in this embodiment. Those of ordinary skill in the art can understand and implement it without creative efforts.

It should be noted that, relational terms such as "first" and "second" in the disclosure are used only to distinguish an entity or operation from another entity or operation, and do not necessarily require or imply any actual relationship or sequence existed between these entities or operations. The terms "comprises", "includes" or any other variation thereof are intended to encompass non-exclusive inclusion such that a process, a method, an article or a device comprising a list of elements includes not only those elements, but also other elements not expressly listed, or also includes elements inherent to such process, method, article or device. Without more limitations, an element qualified by the sentence "comprising a . . . " does not preclude a presence of additional identical elements in the process, method, article or device that includes the element.

Those skilled in the art will be aware of other embodiments of the disclosure after considering the specification and practicing the disclosure disclosed herein. The disclosure is intended to cover any variations, uses, or adaptations of the disclosure, which follow the general principles of the present disclosure and include common knowledge or conventional technical means in the technical field not disclosed herein. The specification and examples are to be regarded as exemplary only, with the true scope and spirit of the disclosure being indicated by the following claims.

It may be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for indicating buffered downlink data, comprising:

generating, by an access point (AP), a beacon frame, wherein the beacon frame comprises an information bit for indicating buffered downlink data, and the information bit for indicating buffered downlink data is configured to indicate whether downlink data is buffered in the beacon frame; and transmitting, by the AP, the beacon frame to a corresponding station in a listening frequency band of each station, wherein the listening frequency band is a frequency band where the corresponding station listens to obtain the downlink data;

wherein before transmitting the beacon frame to the corresponding station in the listening frequency band of each station, the method further comprises:

establishing an association with each station, and negotiating a sleep cycle of each station with each station through a negotiation frame, wherein the negotiation frame comprises the listening frequency band of each station, a frequency band where the association is established being different from the listening frequency band.

2. The method of claim 1, wherein after establishing the association with each station, the method further comprises:

assigning a unique association identifier to each station based on a sequence of establishing the association for all working frequency bands, wherein all the working frequency bands comprise the frequency band where the association is established; or assigning a unique association identifier under each working frequency band to each station that establishes the association.

3. The method of claim 1, wherein generating the beacon frame comprises:

setting an information bit for indicating buffered downlink data in a beacon frame where a wake-up cycle is located to indicate there is the buffered downlink data based on a priority of downlink data to be buffered.

4. The method of claim 1, wherein establishing the association with each station comprises:
    establishing the association with each station by broadcasting a beacon frame in a set frequency band, receiving an association request frame transmitted by at least one station, and returning an association response frame to the corresponding station based on the association request frame; or
    establishing the association with each station by receiving a probe request frame transmitted by at least one station, returning a probe response frame to the at least one station, receiving an association request frame transmitted by the at least one station, and returning an association response frame to the corresponding station based on the association request frame.

5. The method of claim 1, further comprising:
    assigning a unique association identifier to each station based on a sequence of establishing the association for all working frequency bands, wherein all the working frequency bands comprise the frequency band where the association is established; or
    assigning a unique association identifier under each working frequency band to each station that establishes the association.

6. The method of claim 1, wherein establishing the association with each station comprises:
    establishing the association with each station by broadcasting a beacon frame in a set frequency band, receiving an association request frame transmitted by at least one station, and returning an association response frame to the corresponding station based on the association request frame; or
    establishing the association with each station by receiving a probe request frame transmitted by at least one station, returning a probe response frame to the at least one station, receiving an association request frame transmitted by the at least one station, and returning an association response frame to the corresponding station based on the association request frame.

7. A method for obtaining downlink data, comprising:
    listening, by a station, for a beacon frame transmitted by an access point (AP) in a listening frequency band of the station;
    in response to listening for the beacon frame, parsing, by the station, an information bit for indicating buffered downlink data from the beacon frame, wherein the information bit is configured to indicate whether downlink data is buffered in the beacon frame; and
    in response to the information bit for indicating buffered downlink data indicating that downlink data is buffered in the beacon frame, obtaining, by the station, downlink data by transmitting a power saving poll frame to the AP during a contention period of the listening frequency band;
    wherein before listening for the beacon frame transmitted by the AP in the listening frequency band of the station, the method further comprises:
    establishing, by the station, an association with the AP, and negotiating a sleep cycle with the AP through a negotiation frame, wherein the negotiation frame comprises the listening frequency band of the station, a frequency band where the association is established being different from the listening frequency.

8. The method of claim 7, wherein establishing the association with the AP comprises:
    establishing, by the station, the association with the AP by receiving a beacon frame broadcast by the AP in a set frequency band, transmitting an association request frame to the AP, and receiving an association response frame from the AP based on the association request frame; or
    establishing, by the station, the association with the AP by transmitting a probe request frame to the AP, receiving a probe response frame returned by the AP, transmitting an association request frame to the AP, and receiving an association response frame from the AP based on the association request frame.

9. The method of claim 7, wherein establishing the association with the AP comprises:
    establishing the association with the AP by receiving a beacon frame broadcast by the AP in a set frequency band, transmitting an association request frame to the AP, and returning an association response frame to the AP based on the association request frame; or
    establishing the association with the AP by transmitting a probe request frame to the AP, receiving a probe response frame returned by the AP, transmitting an association request frame to the AP, and returning an association response frame to the AP based on the association request frame.

10. The access point of claim 9, wherein the processor is further configured to:
    assign a unique association identifier to each station based on a sequence of establishing the association for all working frequency bands, wherein all the working frequency bands comprise the frequency band where the association is established; or
    assign a unique association identifier under each working frequency band to each station that establishes the association.

11. An access point, comprising:
    a processor; and
    a memory for storing instructions executable by the processor;
    wherein the processor is configured to:
    generate a beacon frame, wherein the beacon frame comprises an information bit for indicating buffered downlink data, and the information bit for indicating buffered downlink data is configured to indicate whether downlink data is buffered in the beacon frame; and
    transmit the beacon frame to a corresponding station in a listening frequency band of each station, wherein the listening frequency band is a frequency band where the corresponding station listens to obtain the downlink data;
    wherein the processor is further configured to:
    establish an association with each station, and negotiate a sleep cycle of each station with each station through a negotiation frame, wherein the negotiation frame comprises the listening frequency band of each station, a frequency band where the association is established being different from the listening frequency band.

12. A station, comprising:
    a processor; and
    a memory for storing instructions executable by the processor;
    wherein the processor is configured to perform the method for obtaining downlink data according to claim 7.

13. A non-transitory computer-readable storage medium having computer instructions stored thereon, wherein when the computer instructions are executed by a processor, the method for indicating buffered downlink data according to claim 1 is implemented.

14. A non-transitory computer-readable storage medium having computer instructions stored thereon, wherein when the computer instructions are executed by a processor, the method for obtaining downlink data according to claim 7 is implemented.

* * * * *